United States Patent [19]
Anolick et al.

[11] 3,801,286
[45] Apr. 2, 1974

[54] SLURRY POLYMERIZATION REACTOR

[75] Inventors: Colin Anolick, Louisville, Ky.;
Robert Allen Covington, Jr.,
Wilmington, Del.

[73] Assignee: E. I. du Pont de Nemours and Company, Wilmington, Del.

[22] Filed: Apr. 5, 1972

[21] Appl. No.: 241,239

Related U.S. Application Data

[63] Continuation-in-part of Ser. No. 873,353, Nov. 3, 1969, abandoned.

[52] U.S. Cl. ................. 23/285, 23/283, 260/95 R, 260/94.9 P, 159/6 W, 259/8, 259/108, 15/93 R, 198/213, 165/92, 165/94, 165/87

[51] Int. Cl. ............................................. C08f 1/98

[58] Field of Search ............. 23/285, 283; 260/95 R, 260/94.9 P; 165/92–94, 87; 159/6 W; 259/8, 108; 15/93 R; 198/213

[56] References Cited
UNITED STATES PATENTS

| | | | |
|---|---|---|---|
| 3,113,843 | 12/1963 | Li | 23/285 |
| 1,951,996 | 3/1934 | Schaefer | 165/92 |
| 3,361,537 | 1/1968 | Ferrante | 23/283 |
| 3,549,334 | 12/1970 | Schneider et al. | 23/285 |

*Primary Examiner*—James H. Tayman, Jr.

[57] ABSTRACT

A chemical reactor for slurry polymerization comprising:
  a. a generally cylindrical vessel having a circular cross-section;
  b. a generally cylindrical, rotatable, open-cage, spiral-flighted, ribbon element coaxially mounted inside of the vessel, having a diameter slightly smaller than the inside diameter of the corresponding part of the vessel wherein it rotates; and
  c. a rod element positioned adjacent to the inside surface of the ribbon and mounted in said reactor vessel independently of said ribbon element so that, during rotation of said ribbon element, relative motion occurs between the rod and ribbon elements, the rod and ribbon elements cooperating and arranged such that said relative motion produces a scraping action to remove agglomerated material adhering to the inside surface of the ribbon.

7 Claims, 1 Drawing Figure

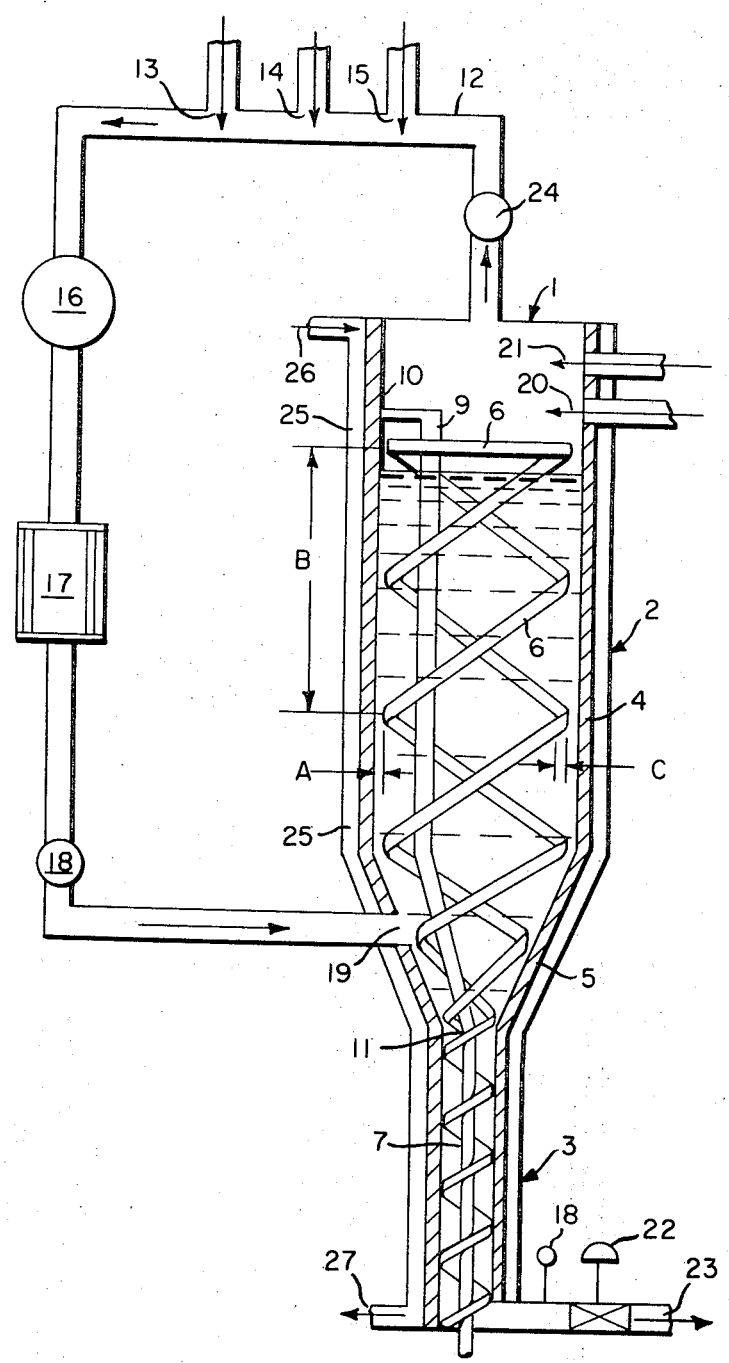

SLURRY POLYMERIZATION REACTOR

CROSS-REFERENCE TO RELATED APPLICATIONS

This application is a continuation-in-part of application Ser. No. 873,353, filed Nov. 3, 1969, entitled Chemical Reactor, now abandoned.

BACKGROUND OF THE INVENTION

The cost of manufacturing elastomers in a solution polymerization process is greatly influenced by the cost of isolating the elastomer from the solvent and its recovery and the cost of the solvent used. In addition, practical means of handling the polymer solution dictate that the viscosity of the reaction mass in the reactor be low which in turn limits the polymer concentration obtainable. Unreacted monomers when separated from the polymer during recovery are desirably recycled to the reactor to make the process economical.

It is known that polymerization can be performed in a "slurry" process by copolymerizing monomers in a selected non-solvent for the polymer such as a halogenated hydrocarbon solution as described in U.S. Pat. No. 3,291,780 or by copolymerizing the monomers in the liquid monomers themselves as disclosed in U.S. Pat. Nos. 3,370,052 and 3,358,055. A "slurry" process, particularly one using a liquid monomer reaction medium, has the advantages of requiring a smaller reactor volume throughput per unit of polymer produced than a solution process and a higher reaction rate per unit amount of catalyst. These advantages translated into a commercial process permit the use of a smaller reactor per unit of polymer produced and mass transfer problems and mixing are minimized because of the lower viscosity of the reaction medium compared to the solution process. In addition, the absence of a solvent eliminates the the need for solvent isolation and recycle equipment minimizing the cost for equipment needed for polymer isolation and purification.

Although "slurry" polymerization has many advantages, it does have one major disadvantage. When the elastomeric copolymer thus prepared sticks to the reactor walls and surfaces in contact with the medium, it fouls the reactor.

British Pat. No. 1,097,282 discloses a polymerization reactor housing a rotating, open-cage spiral ribbon in which (1) the outside diameter of the spiral cage is slightly less than the inside diameter of the reactor and (2) the bottom of the reactor is a funnel directing the reaction mass into a vertical extruder. This apparatus is suggested for mixing in the manufacture of polymers such as nylon (polyhexamethylene adipamide) which is maintained in a molten state in the reactor and leaves the reactor by gravity flow.

This reactor is not useful for preparing elastomeric copolymers by a slurry process because these copolymers are generally sticky materials which will not flow out of the reactor readily. The viscoelastic polymer agglomerates in the reactor and sticks to the spiral ribbon and the sides of the reactor, eventually fouling it.

There is a need for a chemical reactor for carrying out a "slurry" polymerization process whereby the polymer can be removed from the reactor without causing reactor fouling.

SUMMARY OF THE INVENTION

This invention provides a chemical reactor comprising:

a. a generally cylindrical vessel having a circular cross-section;

b. a generally cylindrical, rotatable, open-cage, spiral-flighted, ribbon element which is coaxially mounted inside the vessel, having a diameter slightly smaller than the inside diameter of the corresponding part of the vessel wherein it rotates; and c. a rod element positioned adjacent to the inside surface of the ribbon and mounted independently of said ribbon element in said reactor vessel so that, during rotation of said ribbon element, relative motion occurs between the rod and ribbon elements, the rod and ribbon elements cooperating and arranged such that said relative motion produces a scraping action to remove agglomerated material adhering to the inside surface of the ribbon.

The rod can have a cross-section of any configuration, e.g., elliptical, circular, rectangular, triangular, etc. The rod can be fixed, rotated on its axis counter to the direction of ribbon rotation, or rotated on its axis in the same direction of ribbon rotation provided that relative motion occurs between the rod and the inside surface of the ribbon. In a preferred embodiment the rod rotates counter to the direction of and at twice the speed of ribbon rotation.

DESCRIPTION OF THE DRAWINGS

The FIGURE of the drawing illustrates the preferred embodiment of this invention showing schematically a generally tubular vessel housing an open-cage, double-flighted, spiral ribbon having a rod within the open-cage to scrape the inside of the ribbon in combination with an extruder. The apparatus is shown together with a flow pattern of a polymerization process.

DETAILS OF THE INVENTION

Referring to the FIGURE of the drawing, the apparatus of this invention consists essentially of a generally cylindrical, vertically aligned vessel 1, with a circular cross-section having a polymerization section 2 and a polymer collecting section 3 in communication with each other. Polymerization section 2 is made of a cylindrical section 4 and a truncated cone section 5 and houses an open-cage, double-flighted spiral ribbon 6. The polymer collecting section houses an extruder 7. Alternatively, reactor 1 can be horizontally aligned or canted and the spiral ribbon can be single or multiple flighted.

The spiral ribbon is rotatably mounted and has an outside diameter slightly smaller than the inside diameter of vessel 1 so that it almost scrapes the walls of the polymerization region 2 as it rotates. The ribbon is rotated by conventional driving means (not shown) connected to the central shaft portion of extruder 7, to which the ribbon is rigidly secured. It is desirable to maintain sufficient clearance between the spiral ribbon 6 and vessel 1 to avoid mechanically binding the spiral ribbon. The amount of clearance A can vary according to the type polymer being prepared and the amount of polymer build-up permissible for continuous operation. In preparing an ethylene/propylene/1,4-hexadiene polymer (58/36/6) in a reactor having an inside diameter of 8.9 cm. the spiral ribbon desirably has a clearance of about 0.32 cm. from the inside wall of vessel 1. The pitch of the spiral ribbon can be from ½ to 3 ribbon diameters and preferably is ¾ to 1½ diameters for optimum effectiveness. The pitch B is the longitudinal spacing of corresponding points on adjacent flights and in the case of multiple flights, the pitch is equal to the longitudinal spacing multiplied by the number of flights. The dimension of the spiral ribbon in the radial direction C should be no greater than one-fourth of the largest inside diameter of vessel 1. The lower end of the spiral ribbon conforms to the conical section of the polymerization chamber.

In operation, spiral ribbon 6 simultaneously removes material (e.g., polymer) adhering to the walls of vessel 1 and moves it to extruder 7 which, for practical reasons, usually has a diameter of less than one-half that of vessel 1, and a flight pitch of about ½ to 2 extruder diameters. The spiral ribbon and extruder can be joined to rotate at the same speeds. Also they can be arranged so that they rotate at different speeds.

A stationary rod 9 is placed inside the cage of the spiral ribbon and is positioned to remove polymer from the inside periphery of the spiral ribbon. It is desirable to maintain a clearance between rod 9 and the spiral ribbon 6 to avoid mechanically binding the moving parts. A clearance of up to about 4 percent of the diameter of vessel 1 has been found useful.

Rod 9 can be attached at one end to the inside wall of vessel 1 at point 10 and at the other end can be free or, if desired, attached to the extruder at point 11 by a bearing (not shown) which permits the extruder to rotate but holds the rod stationary.

Rod 9 can have a cross-section of any one of a number of different type configurations, e.g., rectangular, square, elliptical, triangular, or circular; and any one particular cross-section can be used with varying thicknesses along the length of the rod for added strength. If during use polymer build-up on the rod becomes excessive, the portion of the rod in the conical section can be eliminated or the monomer mixing region and the polymer collecting region can be made having the same size cross-section, thereby eliminating the truncated conical section and the rod can be rotated on its axis. In such a case, rod 9 is extended beyond the reactor and conventional driving means (not shown) are used to rotate rod 9 on its axis. Particularly desirable results are obtained by rotating rod 9 counter to and at approximately twice the speed of spiral ribbon 6 rotation.

The apparatus of this invention is useful in preparing polymers wherein the polymer is a separate phase insoluble in the polymerization medium and having a tendency to adhere and agglomerate to the reactor surfaces exposed to the polymer. The polymer can be a homopolymer or a copolymer made by interpolymerizing two or more different monomers.

Polymers that can be prepared using the apparatus of this invention include those obtained by copolymerizing ethylene with another α-monoolefin having the structure:

R—CH=CH$_2$ where R is hydrogen or $C_1$–$C_{16}$ alkyl, preferably straightchained. Representative α-monoolefins are propylene, 1-butene, 1-pentene, 1-hexene, 1-heptene, 1-octene, 1-octadecene, 6-ethyl1-decene, and 5-methyl-1-hexene.

Other polymers include sulfur curable α-olefin elastomeric copolymers. By "sulfur curable" it is meant that the copolymer will contain at least 0.1 gram moles of ethylenic carbon-to-carbon double bonds per kilogram. In order to obtain a copolymer with desirable elastomeric properties, it should contain between about 20 to 80 weight percent ethylene units and 80–20 weight percent of another α-olefin hydrocarbon.

Useful sulfur curable copolymers include the terpolymers of ethylene, another α-monoolefin and a non-conjugated diene. Useful α-monoolefins are described above. Particularly preferred are copolymers of ethylene, propylene, and a non-conjugated diene (EPDM) because of their outstanding physical properties. The diene can be an open-chain or cyclic compound having at least one polymerizable double bond in the sense that at least one double bond of the diene reacts to a substantial degree in forming the polymer backbone. The openchain non-conjugated dienes have the general formula:

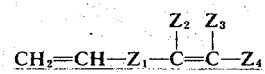

wherein $Z_1$ is $C_1$–$C_8$ alkylene and $Z_2$, $Z_3$, and $Z_4$ are independently hydrogen or alkyl radicals and the Z groups are selected such that the diene has from about 6–22 carbon atoms.

Useful open-chain dienes include 1,4-hexadiene, 1,9-octadecadiene, 6-methyl-1,5-heptadiene, and 15-ethyl-1,15-heptadecadiene.

Useful cyclic non-conjugated dienes include dicyclopentadiene, 5-alkylidene-2-norbornene, e.g., 5-ethylidene-2-norbornene, 5-alkenyl-substituted 2-norbornenes, e.g., 5-(2'-butenyl)-2-norbornene, 2-alkyl-2,5-norbornadienes, e.g. 2-ethyl-2,5-norbornadiene and 1,5-cyclooctadiene.

A preferred EPDM copolymer is ethylene/propylene/1,4-hexadiene.

Representative copolymers made from the above-described α-monoolefins that can be made using the apparatus of this invention are given in U.S. Pat. Nos. 2,933,480; 3,000,866; 3,063,973; 3,093,620; 3,093,621; 3,151,173; and 3,260,708.

The polymer can be prepared by conventional polymerization techniques and is conveniently formed by carrying out the polymerization in the liquid monomers to be polymerized. Since the liquid part of the medium can contain liquids other than the liquid monomers, it will be referred to, for convenience, as the "liquid organic polymerization medium." The catalyst used can be any conventionally known catalyst.

The polymer forms as a separate phase and contains dissolved and occluded liquid organic polymerization media. When the polymer phase is formed, it generally tends to adhere to the equipment surfaces exposed to the polymer particles, coalesces, and forms an agglomerated mass. The agglomerated polymer is removed from the equipment surfaces by the revolving spiral-flighted ribbon, collected, and extruded from the reactor.

The occluded portion is removed or expressed by the mechanical action of kneading or shearing the polymer while still in the reactor and extruder. Pressure increases as the polymer is conveyed through the extruder from reactor pressure to a discharge gauge pressure which is generally above 50 kg/cm$^2$ and preferably between 50 and 150 kg/cm². Pressure differentials so formed cause occluded liquids, as they are freed, to move opposite to the direction of extrusion and return to the reactor. Any dissolved portions can be vaporized from the polymer as the polymer leaves the reactor or can be removed by other conventional means at a later time.

The operation of this reactor will be described as it is used to prepare an elastomeric copolymer of ethylene/propylene/1,4-hexadiene. All parts, percentages, and proportions are by weight unless otherwise indicated.

EXAMPLE 1

The apparatus used to carry out this example is shown in the FIGURE of the drawing. Cylindrical portion 4 of reactor 1 has an inside diameter of 8.89 cm. and a length of 27.9 cm. Truncated conical section 5 which serves as a transition between the cylindrical portion 4 and the polymer collecting region 3 is 3.81 cm. in height with an outside diameter of 8.81 cm. at one end to match the connecting portion of the polymer collecting region 3.

The spiral ribbon contained within the polymerization region 2 has an outside diameter of 8.25 cm. in the cylindrical section of the polymerization region and spirals in the conical section maintaining a clearance of 0.32 cm. It is double-flighted having a pitch of 17.8 cm. Within the spiral ribbon is stationary rod 9 made of steel and positioned to scrape the inside portion of the spiral ribbon as the ribbon rotates. The polymer collecting region is 41.61 cm. long housing an extruder with a varying diameter, pitch, and flight depth.

The extruder is made up of four sections. Details of the sections are now shown. The first section is cylindrical having an outside diameter of 3.81 cm. to match the small diameter of the truncated conical section and a length of 12.4 cm. with flights of 1.11 cm. deep pitched at 3.2 cm. The second section is a transitional section having an outside diameter of 3.81 cm. to match the first section then tapering to a diameter of 2.54 cm. This transitional section has a length of 6.35 cm. with a flight depth ranging from 1.11 cm. to 0.95 cm. and a pitch varying from 3.2 cm. to 2.54 cm., respectively. The third section is cylindrical having an outside diameter of 2.54 cm. and a length of 10.98 cm. The flight depth is 0.95 cm. with a pitch of 2.54 cm. The fourth section is 11.88 cm. long having an outside diameter of 2.54 cm. and a flight depth of 0.38 cm. pitched at 2.54 cm. The transition in flight depth between the third and fourth sections is gradual.

The ingredients are fed to reactor 1 in the following manner: ethylene, propylene, and hydrogen gases are fed to conduit 12 through rotometers (not shown) and directed to the inlet of compressor 16. The average flow rates are as follows: through port 13 passes ethylene at 88.5 grams per hour; through port 14 passes propylene at 437 grams per hour; and through port 15 passes ethylene plus 1.73 volume percent hydrogen at 68 grams per hour. These gases are then compressed in compressor 16 to a pressure of 35.1 kg/cm² and then condensed in water-cooled condenser 17 at a temperature of 25°C. and fed to the conical section of the reactor at 19 through pressure regulating valve 18. A third monomer and the catalysts are added to the reactor as a liquid. One stream is fed to the reactor through port 20 as a 0.0171 mole per liter solution of vanadium tris(acetylacetonate) in 1,4-hexadiene and another stream is fed through port 21 as a 0.639 mole per liter solution of diisobutylaluminum chloride in 1,4-hexadiene. These solutions are fed at a rate of 50 milliliters per hour and 23.5 milliliters per hour, respectively.

The amount of liquid in reactor 1 is maintained at about 1.0 liter. The liquid level is measured with a gamma radiation source and detector (not shown) and manually controlled to maintain proper volume in the reactor. The liquid monomer temperature in reactor 1 is maintained at 45°C.

Reactor 1 is surrounded by a water jacket 25 having inlet port 26 and exit port 27. The water in the jacket is maintained at approximately 50°C. The water jacket serves to prevent heat loss from the reactor by conduction through the reactor wall due to the large surface to volume ratio of this small scale reactor. The polymerization process is exothermal and the liquid monomer temperature in the reactor is maintained at 45°C. by evaporative cooling. The heat of reaction is removed by allowing the reaction liquid to boil. The vapor produced passes through temperature control valve 24 and into conduit 12 to be recycled with fresh monomers.

The polymer forms as a separate phase which adheres to the reactor and processing equipment and agglomerates into a mass. As the spiral ribbon turns, it scrapes the polymer from the sides of the reactor, and the stationary bar 9 scrapes the polymer from the inside surface of the spiral ribbon permitting the helix to pump the polymer to the polymer collecting region 3. Extruder 7 in the polymer collecting chamber pumps the polymer to gauge pressures in excess of 50 kg/cm² for discharge into line 23. The pressure generated by extruder 7 is indicated on pressure gage 18, and pressure control valve 22 is adjusted to obtain desired extrusion gauge pressure between 50 and 150 kg/cm². The spiral ribbon and extruder are operated at 20 rpm.

Extruder 7 shears the polymer as it pumps the polymer from the reactor. Occluded monomers are freed from the polymer during shearing of the polymer by spiral ribbon 6 and the extruder. The freed monomers migrate upwards, against the direction of polymer travel, returning to polymerization region 2. Dissolved monomers in the polymer are vaporized as the polymer moves from the high pressure area in the extruder output through pressure control valve 22.

The copolymerization process is continuous for a period of 29 hours with the production rate of copolymer of about 56 grams per hour. The reaction is maintained at a temperature of 45°C. with a pressure of about 21.1 kg/cm² in the vapor space of reactor 1. A typical analysis of the vapor in the reactor is 0.8 percent nitrogen, 0.2 percent hydrogen, 31 percent ethylene, and 68 percent propylene. Excess monomers are removed from the reactor through a port (not shown) on the side of the reactor vessel to control the liquid level of the reactor so that the level of the liquid never exceeds the height of the spiral ribbon.

Analysis of the copolymer discharged from the extruder, but prior to flashing shows that it contains approximately 0.40 gram of dissolved residual liquid monomers per gram of dry polymer produced. An independent test run under the reaction conditions of this example shows that the solubility of the liquid monomers in the polymer is 0.40 gram of monomers per gram of dry polymer. Therefore, the presence of 0.40 gram of residual liquid monomers show that the entrained or occluded monomers are expressed or removed from the polymer, in the reactor, before it is discharged from the extruder. The monomers are flashed off and analysis shows that the copolymer average composition is 58.3 weight percent ethylene, 36.2 weight percent propylene, and 5.41 weight percent 1,4-hexadiene and has a Wallace Plasticity of 45.

We claim:

1. A chemical reactor for slurry polymerization comprising:
   a. a generally cylindrical vessel having a circular cross-section;
   b. a generally cylindrical, rotatable, open-cage, spiral-flighted ribbon element coaxially mounted inside of the vessel, said ribbon element having a diameter slightly smaller than the inside diameter of the corresponding part of the vessel wherein it rotates; and
   c. a rod element positioned adjacent to the inside surface of the ribbon and mounted in said reaction vessel independently of said ribbon element so that, during rotation of said ribbon element, relative motion occurs between said rod and ribbon elements, the rod and ribbon elements cooperating and arranged such that said relative motion produces a scraping action to remove agglomerated material adhering to the inside surface of said ribbon.

2. The reactor of claim 1 wherein said spiral-flighted ribbon element has a flight pitch of about ½ to 3 ribbon diameters.

3. The reactor of claim 1 wherein the dimension of said spiral-flighted ribbon element in the radial direction is no greater than one-fourth of the largest diameter of said vessel.

4. The reactor of claim 1 wherein said rod element is rigidly secured to said vessel, and the clearance between said rod and said ribbon elements is up to 4 percent of the inside diameter of said vessel.

5. The reactor of claim 1 wherein said rod element is rotated on its axis counter to and at approximately twice the speed of the rotation of said ribbon element.

6. The reactor of claim 5 wherein said rod element has a cross-section varying in thickness along the length of the rod.

7. The reactor of claim 1 wherein extruder means cooperate with said ribbon element such that said ribbon element directly feeds the extruder means.

* * * * *